United States Patent
Bianchi et al.

(10) Patent No.: US 7,654,923 B2
(45) Date of Patent: Feb. 2, 2010

(54) READILY EXTENDIBLE TELESCOPIC LIFTING SYSTEM

(75) Inventors: Damian P. Bianchi, Durham, CT (US); Donald E. Barker, Sandy Hook, CT (US)

(73) Assignee: Robert Mongell, Rockport, ME (US)

( * ) Notice: Subject to any disclaimer, the term of this patent is extended or adjusted under 35 U.S.C. 154(b) by 227 days.

(21) Appl. No.: 11/805,536

(22) Filed: May 22, 2007

(65) Prior Publication Data

US 2007/0298919 A1   Dec. 27, 2007

Related U.S. Application Data

(60) Provisional application No. 60/809,518, filed on May 30, 2006.

(51) Int. Cl.
F16H 7/00 (2006.01)
B66C 23/06 (2006.01)

(52) U.S. Cl. .............. 474/64; 474/65; 474/66; 474/67; 52/121; 343/883

(58) Field of Classification Search ............ 474/64–67; 52/111–118, 120, 121, 125.2, 124.2, 123.1, 52/632; 248/161, 159, 414, 157, 404, 415, 248/327, 333, 336
See application file for complete search history.

(56) References Cited

U.S. PATENT DOCUMENTS 3,296,757 A    1/1967   Goodman
4,176,360 A *  11/1979  Leavy et al. ............... 343/883
4,932,176 A    6/1990   Roberts et al.
5,062,245 A *  11/1991  Dent ........................... 52/118
5,101,215 A *  3/1992   Creaser, Jr. ................ 343/883
5,333,422 A    8/1994   Warren et al.
5,557,892 A *  9/1996   Lavin .......................... 52/121
5,786,854 A    7/1998   Slade et al.
6,347,761 B1   2/2002   Larson

* cited by examiner

Primary Examiner—Robert A Siconolfi
Assistant Examiner—San Aung
(74) Attorney, Agent, or Firm—Melvin I. Stoltz

(57) ABSTRACT

By providing a plurality of cylindrically shaped tube members nested together in coaxially aligned relationship, with each tube member being connected to a separate and independent control segment, with the control segments being constructed for raising and lowering the associated tube segment, an easily produced, reliable, dependable, and highly portable telescopically extendable and retractable multi-element system is realized. In the preferred embodiment, each control segment incorporates a separate endless loop drive belt which is cooperatively associated with a pair of pulleys mounted at opposed ends of the segment. Furthermore, each control segment is interconnected to the endless loop drive belt of an adjacent segment for causing all of the segments to move simultaneously in response to the initial movement of a first control segment.

19 Claims, 9 Drawing Sheets

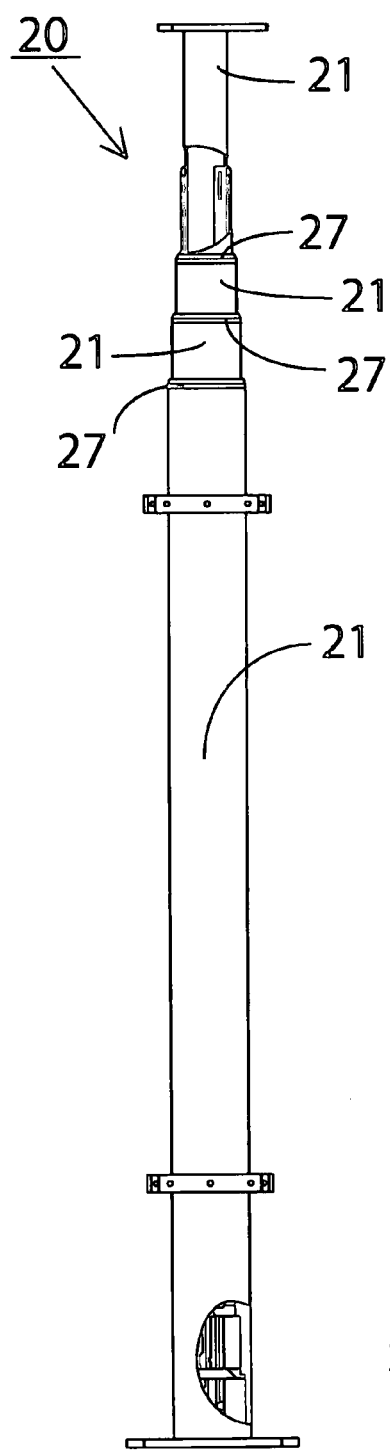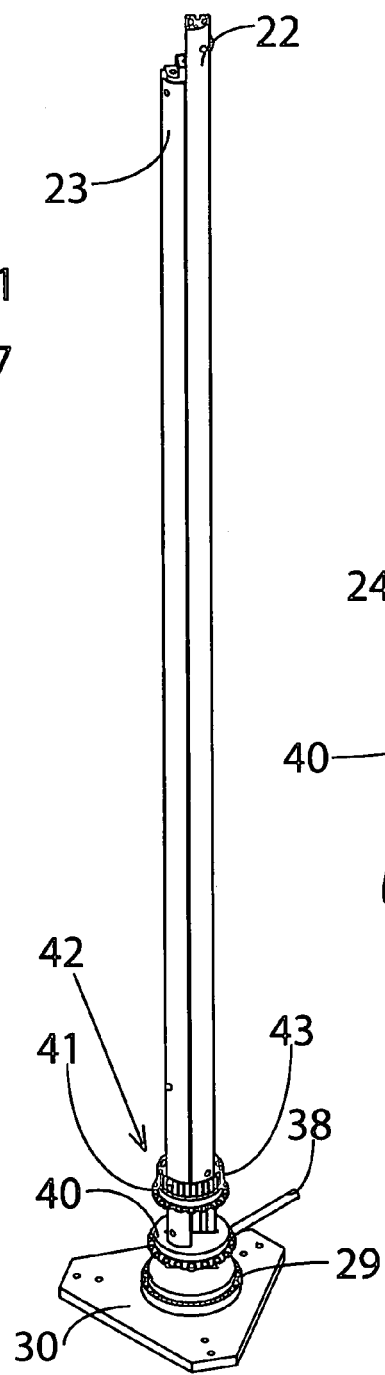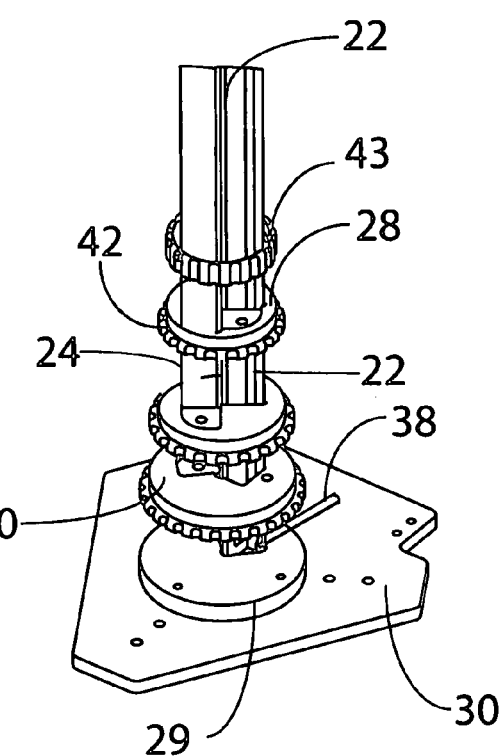

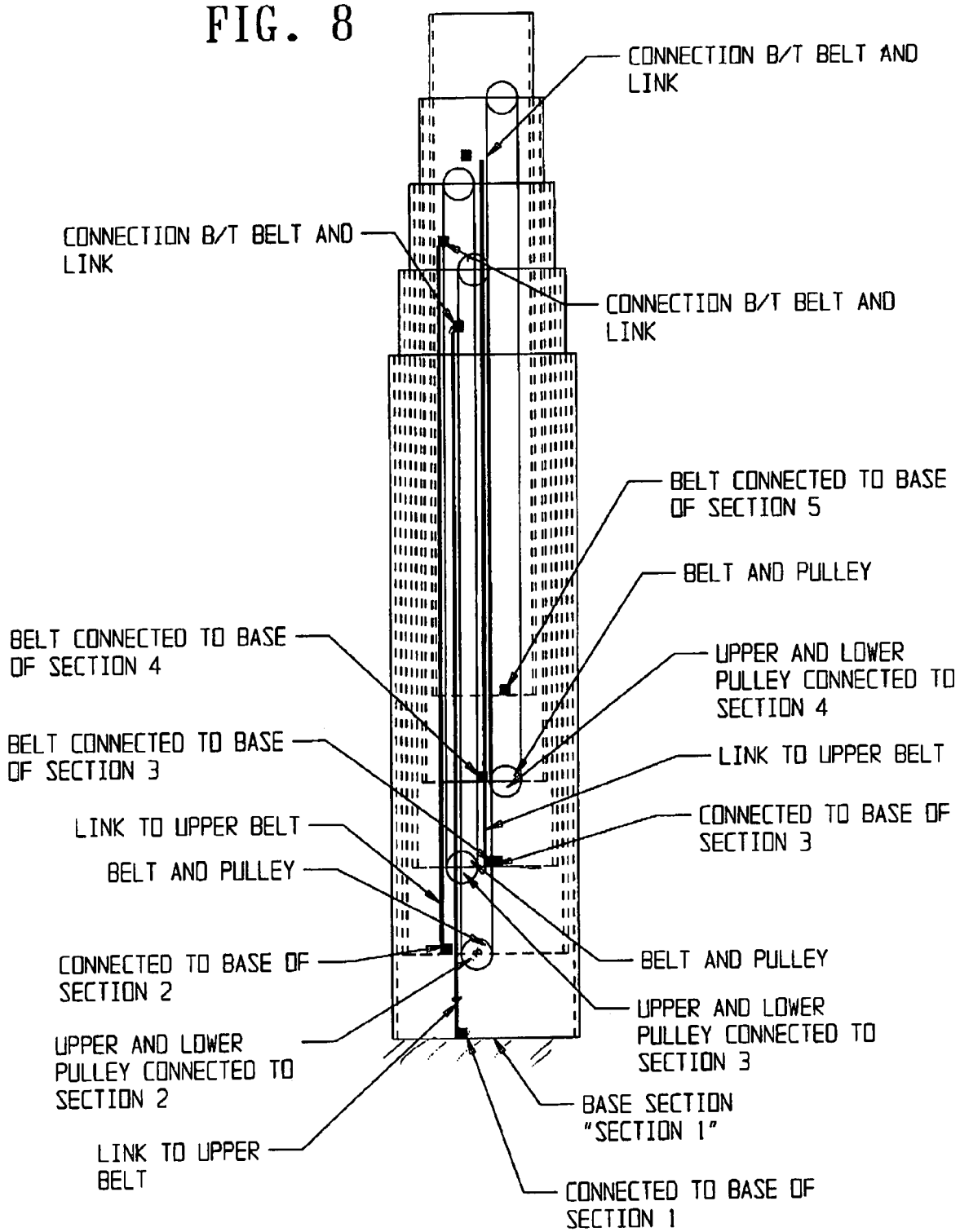

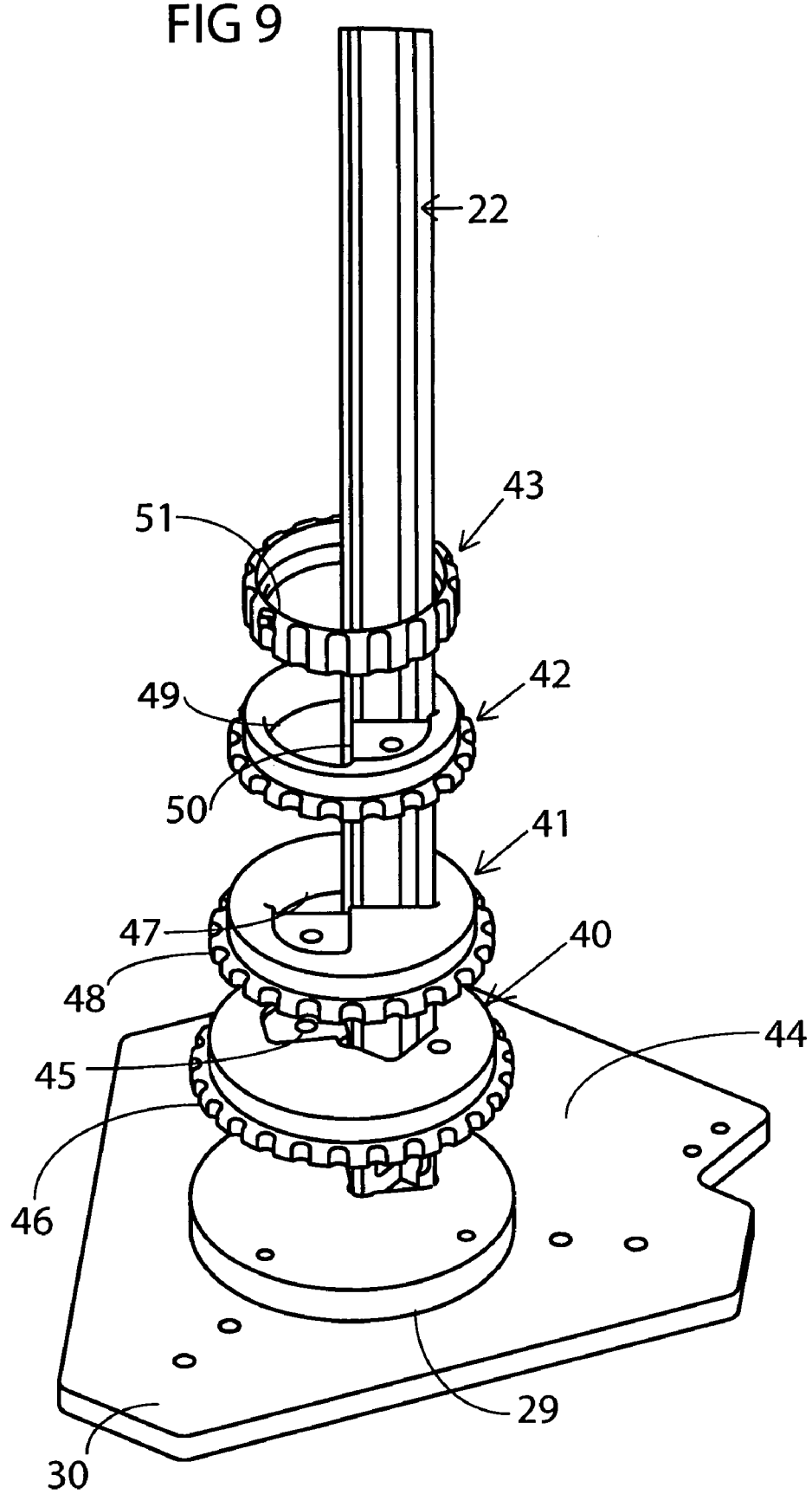

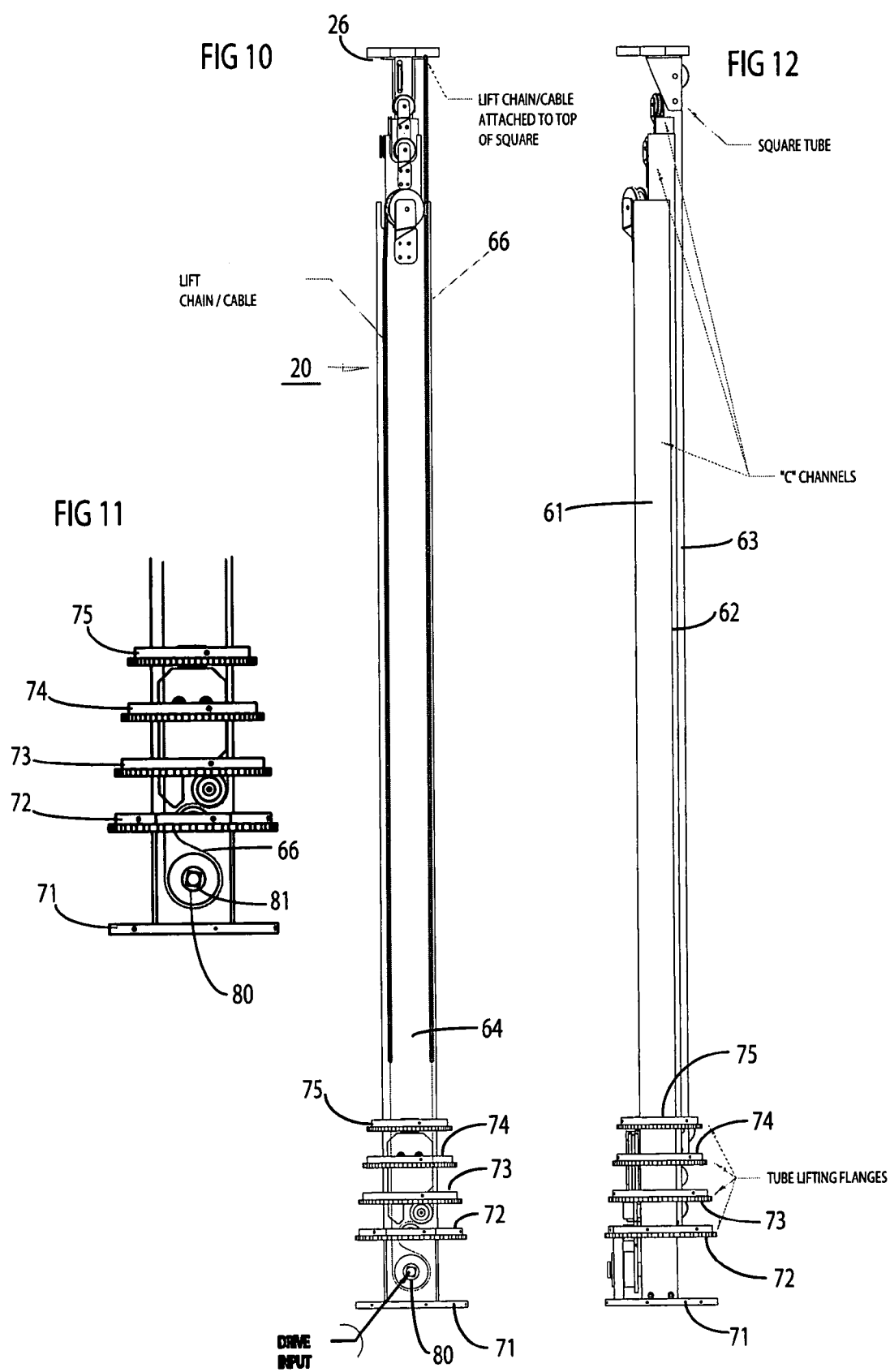

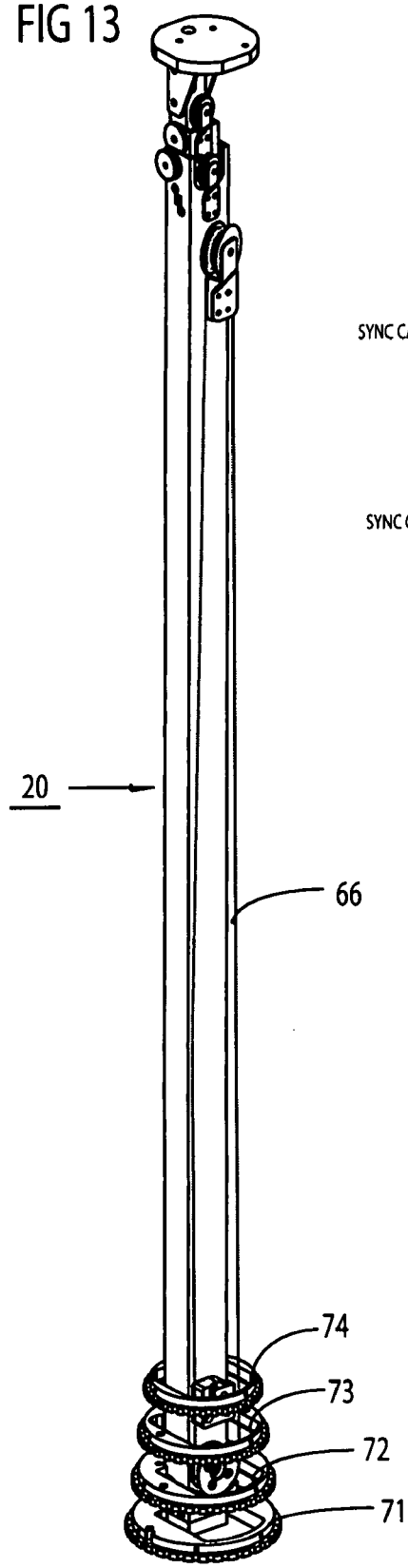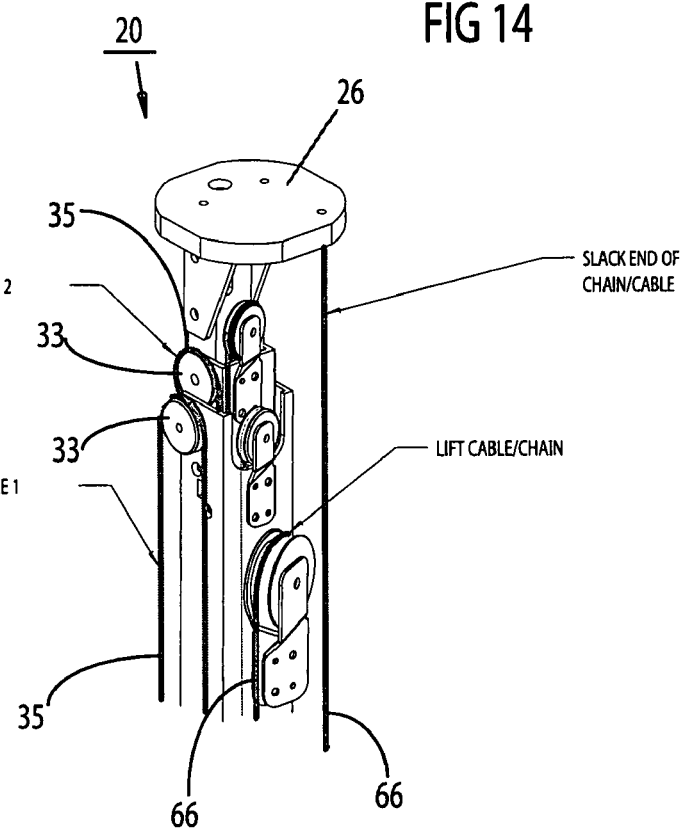

READILY EXTENDIBLE TELESCOPIC LIFTING SYSTEM

RELATED APPLICATIONS

This application is related to U.S. Provisional Patent Application Ser. No. 60/809,518 filed May 30, 2006 entitled READILY EXTENDIBLE TELESCOPIC LIFTING SYSTEM.

TECHNICAL FIELD

This invention relates to readily extendible and retractable lifting systems and, more particularly to lifting systems which are reliable, dependable, highly portable and incorporate a plurality of telescopic elements constructed for simultaneous deployment.

BACKGROUND ART

Substantial attention has recently been paid to developing systems which enable poles, masts, antennas and the like to be rapidly deployed from a compact position to a fully extended position. In this regard, numerous activities require the rapid deployment of elongated poles, antennas, masts, etc., as well as the rapid removal and/or compaction of the pole or antenna after use.

In attempting to meet this demand, several systems have been developed which provide extendable and retractable masts, polls, or antennae. However, these prior at systems are extremely difficult to operate in a continuous and reliable manner. In addition, these prior art systems are typically very heavy, thereby being difficult to transport. As a result, the use of these prior art systems is limited to being employed only where transportation equipment is available.

Furthermore, these prior art systems typically require complex internal constructions in order to achieve the desired rapid extension of the plurality of segments. In this regard, these complex interconnected elements are extremely difficult to assemble, causing the resulting product to be expensive. Furthermore, the complex component construction reduces the reliability of the system and causes repairs to be extremely difficult, as well as often required.

Presently, there are numerous commercial and military applications and instances in which a rapidly deployable, highly portable, telescopically extendable and retractable multi-element systems are required. In particular, in many circumstances, products such as telescopes, microphones, audio listening devices, site providing devices, measuring instruments, weather sensing devices, and the like, must be rapidly deployed in an elevated manner in order to obtain the information being sought.

In this regard, the ability to securely affix a particular instrument or device to a mounting platform and rapidly raise the platform to an elevated location for positioning the particular device in an optimum location is often required in broad, all-inclusive, multi-discipline areas and/or fields. However, in spite of the broad based commercial demand that has existed for portable, reliable, and dependable telescopically extendable multi-element systems, no prior art system has been created which is capable of satisfying all of the demands and requirements desired by end users.

Therefore, it is a principal object of the present invention to provide a telescopically extendable and retractable multi-element system which is light-weight, while also being capable of supporting heavy instruments or devices.

Another object of the present invention is to provide a telescopically extendable and retractable multi-element system having the characteristic features described above which is capable of enabling any device or equipment supported thereon to be quickly and easily raised to an elevated level, while also enabling the supported device to be quickly and easily lowered for removal and rapid transportation to another location.

Another object of the present invention is to provide a telescopically extendable and retractable multi-element system having the characteristic features described above wherein the plurality of elements forming the telescopically extendable system of the present invention cooperate with each other to be quickly and easily longitudinally extended in a rapid, and easily employed manner.

Other and more specific objects will in part be obvious and will in part appear hereinafter.

SUMMARY OF THE INVENTION

By employing the present invention, all of the difficulties and drawbacks found in the prior art systems has been overcome and an easily produced, reliable, dependable, and highly portable telescopically extendable and retractable multi-element system is realized. In accordance with the present invention, a plurality of cylindrically shaped tube members are nested together in coaxially aligned relationship, with each tube member being connected to a separate and independent control segment. Furthermore, each control segment is constructed for raising and lowering the associated tube segment.

In addition, in the preferred embodiment of the present invention, each control segment incorporates a separate endless loop drive belt which is cooperatively associated with a pair of pulleys mounted at opposed ends of the segment. In addition, each endless loop drive belt is constructed for continuous movement when activated.

Furthermore, each control segment is interconnected to the endless loop drive belt of an adjacent segment, thereby causing all of the segments to move simultaneously in response to the initial movement of a first control segment. In this way, a fully synchronized, integrated, cooperating construction is attained and the rapid deployment of the entire support system is realized.

In the preferred embodiment of the present invention, the first or primary control segment employed comprises an endless loop chain drive system which is constructed before being activated by an external drive force. Preferably, the external drive force comprises a hand operated crank, power operated rotatable drive member, or an equivalent drive system.

Regardless of the manner in which the external drive force is applied to the telescopically extendable/retractable multi-element system of the present invention, the system of the present invention is capable of being quickly and easily, rapidly deployed from a fully compacted position to a fully extended position, in a simple, straightforward manner. Furthermore, due to the construction of the present invention, as is more fully detailed herein, the telescopic, multi-element system of the present invention is able to be transported to any remote location, with ease and simplicity, and employed to achieve all of the required goals of the particular project or task.

In the preferred embodiment of the present invention, each control segment incorporates a plate member formed at the base thereof with the plate member being interconnected to the telescopic tube portion associated therewith. In this way, the axial movement of each control segment causes the simultaneous movement of the associated plate member and tube segment. As a result, by providing the required external drive force to the system, the rapid deployment of the multi-element, telescopic, readily extendable system of the present invention is achieved.

In this way, any desired payload, electrical hardware, or optical device is quickly and easily raised to a desired height or position for achieving a particular required purpose. In addition, once the required purpose has been realized, the multi-element, telescopic, readily employable system of the present invention is quickly and easily retracted into its compact position and removed as required.

The invention accordingly comprises the features of construction, combination of elements and arrangement of parts which will be exemplified in the construction hereinafter set forth, and the scope of the invention will be indicated in the claims.

THE DRAWINGS

For a fuller understanding of the nature and objects of the invention, reference should be had to the following detailed description taken in connection with the accompanying drawings, in which:

FIG. 1 is an elevation view of the readily extendable, telescopic, multi-element support system of the present invention shown fully assembled and partially extended;

FIG. 2 is a perspective view of the readily extendable, telescopic, multi-element, support system of the present invention, shown with the cylindrical tube members removed;

FIG. 3 is an exploded perspective view of the lower portion of the readily extendable, telescopic, multi-element, support system of FIG. 2;

FIG. 8 is a diagrammatic view showing the plurality of elements forming the readily extendable, telescopic, multi-element support system of the present invention in cooperating interconnected interengagement with each other;

FIG. 9 is a perspective view depicting the support base of the support system of the present invention shown with a single elongated control segment and each of the plate members forming component of the multi-element support system of this invention;

FIG. 10 is an elevation view of a second preferred embodiment of the readily extendable, telescopic, multi-element support system of the present invention shown fully assembled and ready for use;

FIG. 11 is a side elevation view, partially broken away, of the lower portion of the telescopic, multi-element, support system of FIG. 10;

FIG. 12 is a side elevation view of the readily extendable, telescopic, multi-element support system of FIG. 10;

FIG. 13 is a perspective view of the readily extendable, telescopic, multi-element support system of FIG. 10;

FIG. 14 is a perspective view, partially broken away, of the upper portion of the readily extendable, telescopic, multi-element support system of FIG. 13;

DETAILED DISCLOSURE

Figure 4:
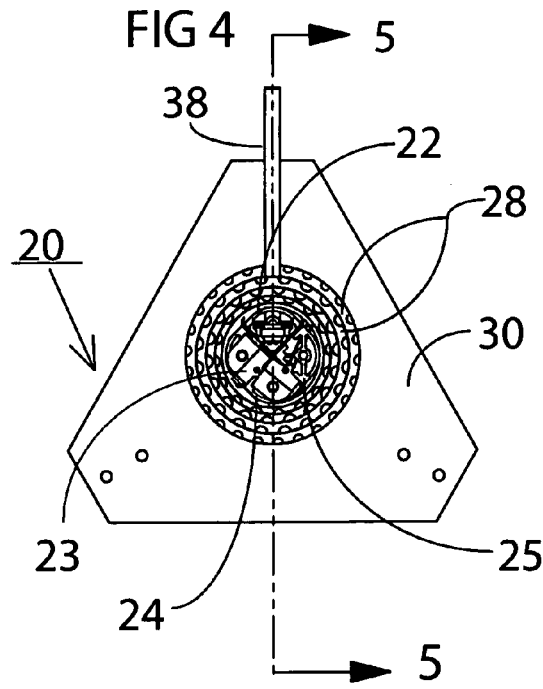
FIG. 4 is a top plan view of the readily extendable, telescopic, multi-element support system of FIG. 2.
Figure 5:
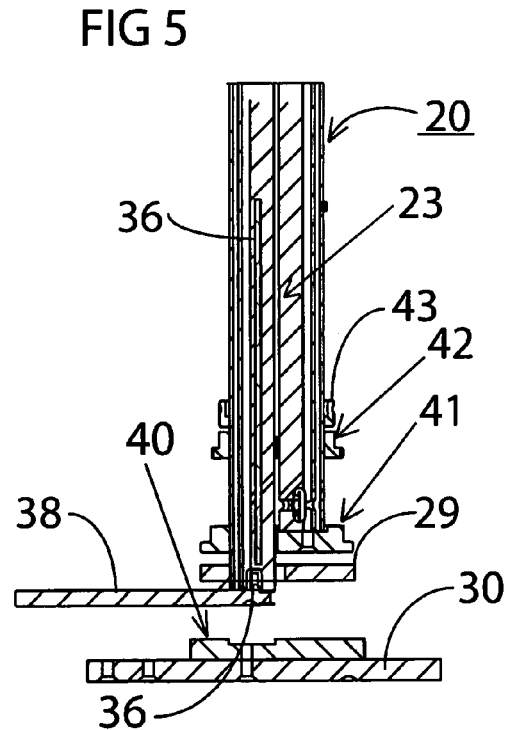
FIG. 5 is a cross-sectional side elevation view, partially broken way, of the readily extendable, telescopic, multi-element support system of the present invention taken along line 5-5 of FIG. 4.

By referring to FIGS. 1-17, along with the following detailed discussion, the construction and operation of the two preferred embodiments of the present invention can best be understood. However, based upon this disclosure, it will become evident that further alternate constructions can be implemented without departing from the scope of the present invention. Consequently, it is to be understood that the following disclosure, along with the referenced drawings, are provided for exemplary purposes only and are not intended as a limitation of the present invention.

In FIGS. 1-9, one preferred embodiment of the readily extendable, telescopic, easily deployed, multi-element support system 20 of the present invention is depicted.

In FIG. 1, support system 20 is shown in its un-extended, compact position, with a plurality of cylindrical tube members 21 mounted in coaxial alignment with each other, forming a single, telescopically constructed configuration. In FIG. 1, tube members 21 are shown in their compact position as is found during their initial stages of deployment. Each tube member 21 is independent of the other, with each tube member 21 being coaxially aligned with each other for achieving the desired elongated, readily deployed, telescopically extendible, product supporting configuration. Furthermore, platform 26 is mounted to tube member 21 which is constructed to be the furthest extended tube member for enabling any desired device or product to be supported thereon.

In FIGS. 2-9, the preferred construction and operation of this embodiment of the present invention is fully detailed. By referring to these Figures, along with the following detailed discussion, the construction and operation of this first preferred embodiment of the present invention can best be understood.

As depicted, the readily extendable, telescopic, multi-element support system 20 of the present invention incorporates a plurality of separate and independent control segments 22, 23, 24, and 25. In order to clearly depict the present invention, cylindrical tube members 21 are removed in FIGS. 2-7, thereby revealing the interior components which control the axial, longitudinal movement of tube members 21.

In order to control the axial or longitudinal movement of tube members 21, each tube member 21 is controllably associated with one elongated control segment 22, 23, 24, or 25. In addition, a plurality of plate members 40, 41, and 42 are also employed and are individually secured to the bottom of one control segment 23, 24, and 25, with each tube member 21 mounted to a plate member at the base thereof. As detailed below, plate member 43 is also employed and is mounted to the smallest diameter tube member 21, without being mounted to a control segment. In the preferred construction, each tube member 21 is also interconnected with a circular shaped ring element 27 at the top edge thereof, in order to prevented any unwanted movement of the tube members, as well as to keep the tube members in the desired co-axial, vertically aligned relationship.

As depicted in the drawings, multi-element support system 20 incorporates four separate and independent elongated control segments 22, 23, 24, and 25. However, any desired number of control segments can be employed without departing from the scope of this invention. For exemplary purposes only, four control segments are depicted and detailed herein. However, if a telescopic support system capable of being extended to substantially greater length is desired, support system 20 can be constructed with additional control segments to attain any desired construction or configuration being sought.

In the preferred construction of the present invention, cylindrical tube members 21, and control segments 22, 23, 24 and 25 are mounted to a large support base 30, which is constructed for being positioned wherever desired. In addition, anchor plate 29 is employed and is affixed to support base 30, with control segment 22 affixed thereto. By employing this construction, an easily transported, and easily employed support system is provided for enabling multi-element support system 20 of the present invention to be positioned in any required location with inherent stability.

In addition, in this embodiment of the present invention, control segments 22, 23, 24, and 25, are each constructed for being mounted in nested, cooperating relationship with each other. As a result, since four separate and independent control segments are employed in this embodiment, each control segment comprises a cross-sectional configuration having an outer arcuate width of about 90°. In this way, each of the control segments are easily mounted with each other, defining a generally circular array. As would be evident to one having ordinary skill in the art, if multi-element support system 20 is to be constructed for extending greater lengths, additional control segments would be employed, with each control segment having a smaller cross-sectional profile.

In the preferred construction of this embodiment of the present invention, anchor plate 29 is affixed to control segment 22, with the outermost or largest diameter tube member 21 mounted to the outer peripheral smooth portion of anchor plate 29. In addition, control segment 23 is securely affixed to plate member 40 with its associated tube member 21 secured to the outer peripheral smooth surface portion of plate member 40.

Similarly, elongated control segment 24 is affixed to plate member 41 with its associated tube member mounted to the outer smooth surface portion of plate member 41, while control segment 25 is affixed to plate member 42 with tube member 21 affixed to the outer smooth surface portion of plate member 42. Finally, as discussed above, plate member 43 is not associated with a control segment and is affixed to tube member 21 having the smallest diameter. In this way, the longitudinal movement of elongated control segments 23, 24, and 25, as detailed below, simultaneously causes the longitudinal, axial movement of all of the tube members 21.

In addition, as clearly depicted in FIG. 9, anchor plate 29 and plate members 40, 41, 42, and 43 each comprise unique, specific constructions. As is evident from this detailed disclosure, plate members 40, 41, 42, and 43 move longitudinally along the length of multi-element support system 20, with each plate member moving a specific distance, due to the control segment to which the plate member is affixed. In addition, anchor plate 29 is secured to support base 30, and does not move. Consequently, anchor plate 29 incorporates support zone 44 for receiving control segment 22 and enabling control segment 22 to be securely affixed thereto. The remainder of the interior portion of anchor plate 29 remains solid.

In constructing plate member 40 for operation in multi-element support system 20, plate member 40 incorporates cavity 45 formed therein directly adjacent support zone 46. In this way, control segment 22 is able to pass through cavity 45 and plate 40, while control segment 23 is securely mounted to support zone 46. As a result, plate member 40 is able to move along the length of control segment 22 as control segment 23 is moved longitudinally.

Similarly, plate member 41 comprises an enlarged cavity 47 and support zone 48 positioned adjacent thereto. By employing this construction, plate member 41 is able to move longitudinally along the length of both control segments 22 and 23, while enabling control segment 24 to be securely affixed in support zone 48.

In addition, plate member 42 incorporates cavity 49 with support zone 50 positioned adjacent thereto. As with the previous plate members, cavity 49 enables plate member 42 to pass along the length of control segments 22, 23, and 24, while securely retaining and supportingly maintaining control segment 25 in support zone 50. In this way, each of the plate members and each of the control segments are capable of moving independently of each other, without causing any interference.

Finally, plate member 43, which is not mounted to a control segment, is securely affixed to the base of the final tube member 21, having the smallest diameter. As shown in FIG. 9, plate member 43 comprises a substantially circular cavity 41 formed therein, effectively establishing plate member 43 as a circular ring mounted to the base of tube member 21 for preventing tube member 21 from wobbling or moving in an undesirable side to side manner. Although plate member 43 is not affixed to a control segment, plate member 43 and tube member 21 affixed thereto, move longitudinally along the length of support system 21 by being interconnected to the synchronization cable/belt 35 of control segment 25, as fully detailed below.

Figure 6:
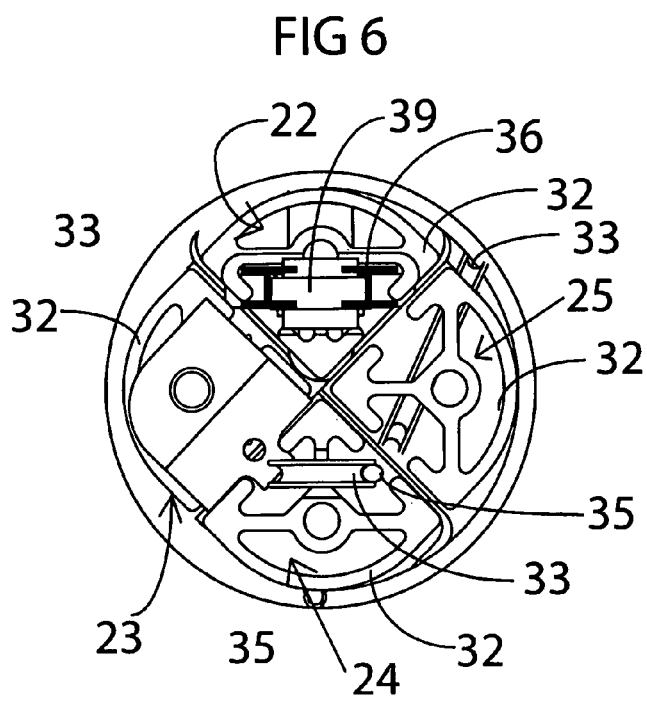
FIG. 6 is a top plan view of the plurality of elongated control segments forming principal components of the telescopic, multi-element support system of the present invention.

In order to achieve the desired longitudinal movement of multi-element support system 20 form its compact position to its fully extended position, with each of the components thereof longitudinally extended fully and completely, the desired input torque is applied to drive arm 38. By rotationally moving drive arm 38, sprocket drive wheel 37 is rotated, causing chain drive belt 36 to continuously move along the length of control segment 22. As shown in FIG. 6, control segment 22 incorporates wheel 39 mounted to the upper terminating end thereof for enabling chain drive belt 38 to move continuously along the length of control segment 22.

In the preferred construction, chain drive belt 36 is interconnected with plate member 40 in order to cause plate member 40 to be raised simultaneously with the movement of chain drive belt 36. As a result, whenever drive arm 38 is rotationally driven, the movement of chain drive belt 36 causes plate member 40, along with control segment 23 mounted thereto, to be longitudinally raised simultaneously.

Similarly, plate member 41 is connected to synchronization belt/cable 35 of control segment 23 in order to cause control segment 24 and plate member 41 to move simultaneously with the movement of control segment 23. Furthermore, plate member 42 is connected to synchronization belt/cable 35 to move simultaneously with the longitudinal movement of control segment 24. In this way, each of the control segments move simultaneously upon activation of chain drive belt 36.

As control segment 23 is longitudinally moved upwardly, endless loop synchronization belt/cable 35 mounted therein is forced to move along the length of control segment 23 in cooperating relationship with pulleys 33 and 34. The movement of synchronization belt/cable 35 in the proper direction is controlled by the interconnection between belt/cable 35 of control segment 23 and wheel 39 of chain belt assembly 36. Similarly, the interconnection between plate members 41 and 42 with synchronization cable/belt 35 of the adjacent control segment assures the movement of cable/belt 35 and each control segment is in the desired direction.

Figure 7:
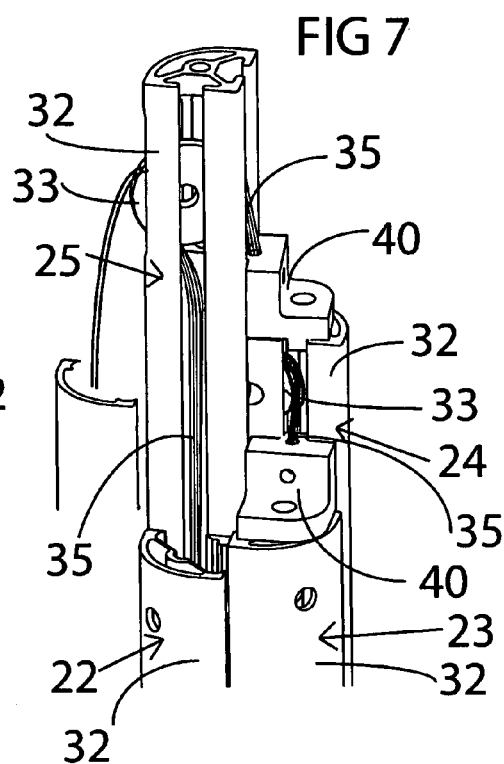
FIG. 7 is a perspective view of the plurality of the elongated control segments of FIG. 6 shown in the process of being extended.

As best seen in FIGS. 6 and 7, each elongated control segment 22, 23, 24, and 25 comprise substantially identical overall constructions. In this regard, elongated control segments 22, 23, 24, and 25 each comprise elongated frames or extrusions 32 formed as a single elongated component extending the desired length and having the overall shape required for providing the nested cooperating relationship to the adjacent frames or extrusions 32. In addition, elongated control segments 23, 24, and 25 incorporate a pair of pulleys 33 and 34 mounted adjacent opposed ends of extrusion 32, with endless loop synchronization belt or cable 35 extending between and interconnecting pulleys 33 and 34.

In the preferred construction, elongated control segment 22 is constructed in a manner similar to cooperating control segments 23, 24, and 25. However, in order to assure completely controlled and reliable operation of multi-element support system 20, control segment 22 incorporates chain drive system 36 integrally mounted therein, as opposed to the use of pulleys and endless loop drive belts.

In addition, as discussed above, chain drive belt 36 of control segment 22 is constructed for being driven by an external drive force. In this regard, the external drive force may be provided by a hand crank or a powered drive member, such as a drill, which produces the necessary rotation. However, regardless of the external drive force employed, external drive arm 38 is mounted along the bottom edge of control segment 22, with drive arm 38 interconnected to chain drive system 36 through sprocket drive wheel 37.

By employing this construction, the drive force applied to drive arm 38, causes chain drive system 36 to be activated, through the rotation of drive wheel 37, continuously moving the chain drive throughout the length of elongated control segment 22. This movement causes elongated control segments 23, 24, and 25 to simultaneously move in the desired direction.

As discussed above, and diagrammatically represented in FIG. 8, elongated control segments 22, 23, 24, and 25 are all interconnected to each other in order to assure that the movement of chain drive system 36 causes the simultaneous movement of endless synchronization belts/cables 35 in each associated control segment. As a result, the input force to chain drive system 36 causes the automatic and synchronous movement of elongated control segments 23, 24, and 25 to their fully extended positions.

In this regard, control segment 23 is positioned adjacent control segment 22 and is directly connected to chain drive system 36 of control segment 22 for causing control segment 23 to be raised simultaneously with the movement of chain drive system 36. In addition, by securely interlocking control segments 23 and 24 to the endless loop drive belt 35 of each adjacent control segment, the movement of each endless loop drive belt 35 controls the axial movement of each adjacent, interlocked control segment. As a result, control segments 23 and 24 are forced to move axially simultaneously with the movement of chain drive system 36 of control segment 22.

Finally, by interlocking control segment 25 to the endless loop drive belt 35 of adjacent interlocking control section 24, control segment 25 is also forced to move axially simultaneously with the axial movement of control segments 23 and 24. In this regard, it should be understood that endless loop drive belt 35 is constructed for being continuously moved about pulleys 34 and 35 whenever the elongated control segment in which these components are mounted is axially moved. Consequently, the input drive force to external drive arm 38 of chain drive system 36 produces the initial movement of the chain drive system, causing control segments 23, 24, and 25 to simultaneously move in the manner detailed above and diagrammatically shown in FIG. 8.

By employing the construction detailed above and shown in the drawings, a multiplier effect is attained for the overall distance traveled by each adjacent control segment. Although each control segment travels the same axial distance relative to the control segment adjacent thereto, a multiplier effect is realized since control segment 23 travels the length of control segment 22, while simultaneously raising control segments 24 and 25. As a result, control segment 24 travels the length of control segment 23 although that length is increased by the travel distance of control segment 23 relative to control segment 22. Finally, control segment 25 travels the length of control segment 24 while also being raised, in addition thereto, the overall distance traveled by control segments 24 and 23. As result, readily extendable, telescopic, multi-element support system 20 is capable of being extended substantial distances with ease and simplicity.

In order to provide the desired locked interengagement of control segments 23, 24, and 25 with their adjacent control segments, a locking bracket 40 is employed. As shown in FIG. 7, locking bracket 40 is depicted mounted to elongated control segment 23, while a separate and independent locking bracket 40 is depicted securely affixed to adjacent elongated control segment 24. In addition, as shown, endless loop drive belt 35 of control segment 24 is depicted passing through locking bracket 40 of control segment 23, while endless loop drive belt 35 of control segment 25 is shown secured in locked engagement with bracket 40 of control segment 24.

By employing locking bracket 40 and mounting bracket 40 in the required positions, the desired interlock, cooperating, secure interengagement of control segments 22, 23, 24, and 25 relative to each other is easily achieved. As a result, by employing this construction, the desired easily extended, telescopic, multi-element support system 20 of the present invention is realized, with the unique capabilities and inherent superior performance results being realized.

Finally, as shown in FIG. 7 and discussed above, plate member 43 and tube member 21 affixed thereto are controllably interconnected with pulley 32 and/or synchronization cable/belt 35 of control segment 25. As a result, as pulley 33 rotates and synchronization belt/cable 35 advances upwardly along the length of control segment 25, the final tube member 21 with its plate member 43 are longitudinally raised, fully extending support system 20 to its maximum length. In this way, the embodiment of support system 20 provides the desired rapid deployment of the longitudinally extended sections both quickly and easily in order to enable any desired device mounted to platform 26 to be raised to a desired height.

In FIGS. 10-17, a second preferred embodiment of the readily extendable, telescopic, easily deployed, multi-element support system 20 of the present invention is fully depicted. In this embodiment, a construction similar to the construction detailed above is employed. However, in this alternate, second preferred embodiment, multi-elements supporting system 20 incorporates a plurality of separate and independent elongated control segments 61, 62, and 63, each of which are formed as elongated channel members having a substantially C-shaped cross-section. In addition, an elongated, longitudinally extending, square tube member 64 is also employed in combination with the C-shaped channel sections.

By employing this construction, it has been found that the C-shaped control segments are easily mounted in nested interengagement with each other, with the longitudinally extending, square tube member 64 positioned coaxially with C-shaped control segments 61, 62, and 63. In this way, a compact, fully integrated construction is realized. It has been found that by using this configuration, heavier payloads, devices, and/or instruments are capable of being easily supported.

In the preferred construction of this alternate embodiment, a single cable/chain 66 is mounted at the base of first control segment 61 and extends therefrom in a serpentine manner over pulleys mounted at the bottom and top of control segments 62 and 63, as well as tube member 64. As detailed below, chain/cable 66 functions as a lifting cable for causing control segments 62 and 63, and tube member 64 to be telescopically extended in the desired manner.

As with the previous embodiment detailed above, this embodiment of the present invention also incorporates mounting platform 26 formed at the upper terminating end of square shaped channel 64 in order to enable any desired devices, equipment, instruments, etc. to be securely mounted to a supporting platform for being raised to the desired height. In addition, in order to assure that chain/cable 66 functions continuously, repeatedly, and dependably in longitudinally extending control segments 62 and 63, as well as square tube member 64, the terminating end of chain/cable 66 is mounted to the terminating end of square tube member 64 directly adjacent platform 26. By employing this construction, chain/cable 66 is maintained taut, eliminating any slack that might otherwise result from the movement of chain/cable 66.

As with the embodiment detailed above, C-shaped control segments 62 and 63 incorporate synchronous cable and pulley systems. As a result, each section moves relative to the adjoining section simultaneously. The principal difference with this embodiment and the embodiment detailed above is that most of the lifting weight is placed on chain/cable 66. In this regard, in order to assure continuous, trouble-free operation, chain/cable 66 is preferably constructed partly from chain links and partly from cable material. Although chain links could be used throughout, it has been found that the weight of chain links would be substantially greater than the dual material construction. Consequently, the dual material construction is preferred.

In addition, as clearly depicted in FIGS. 10-17, in this embodiment, control segments 61, 62, and 63, as well as square tube member 64 are all mounted to a plate member at the bottom edge thereof. In this regard, C-shaped control segment 61 is mounted to plate member 71, while C-shaped control member 62 is mounted to plate member 72, and C-shaped control segment 63 is mounted to plate member 73. In addition, square tube member 64 is mounted to plate member 74.

In this embodiment, each plate member 71, 72, 73, and 74 are directly interconnected to lifting chain/cable 66 through a series of pulley systems mounted to the plate members, the control segments, and the tube member. In this way, the longitudinal movement of chain/cable 66, which is controlled by rotating sprocket wheel 80 mounted at the base of control segment 61, causes each of the control members and square tube member to be longitudinally extended in the desired manner.

As shown in FIGS. 10 and 11, sprocket wheel 80 incorporates an Input drive element 81 which enables any desired rotation producing device to be interconnected thereto in order to cause sprocket 80 to rotate. In this way, chain/cable 66 is advanced and support system 20 of the present invention is quickly and easily extended in the desired manner, as well as quickly and easily collapsed back into its original configuration.

Since plate member 71 is mounted to control segment 61 and control segment 61 is constructed for remaining stationary, plate member 71 merely incorporates receiving or supporting zone 85 formed therein in order to enable control segment 61 to be securely affixed thereto. However, since plate members 72, 73, 74, and 75 must all advance along one or more C-shaped control segments, each of these plate members incorporate a specific configuration for enabling the plate member to move in the desired manner.

Figure 15:
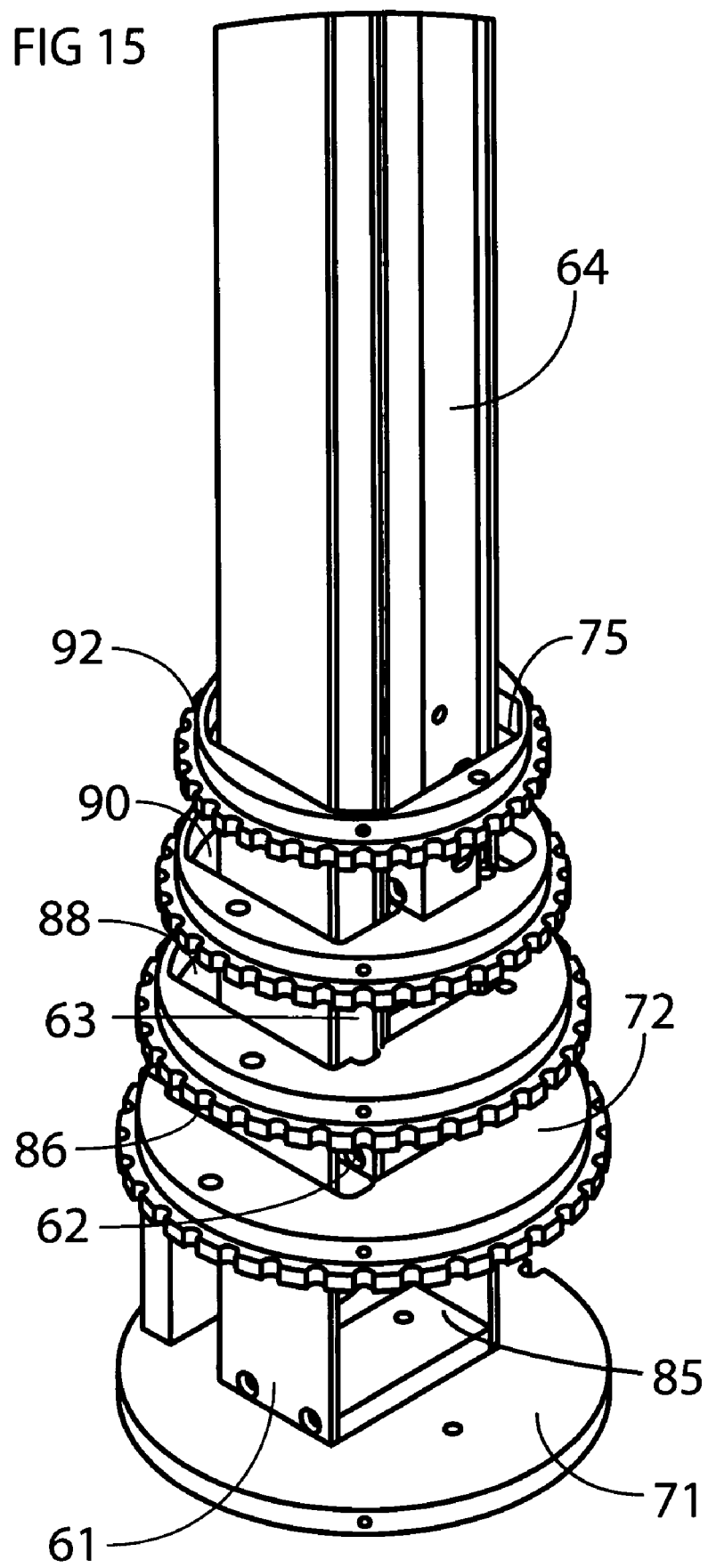
FIG. 15 is a perspective view, partially broken away, depicting the mounting plates and the lower portion of the control segments forming principal component of the telescopic, multi-element, support system of the present invention.
Figure 16:
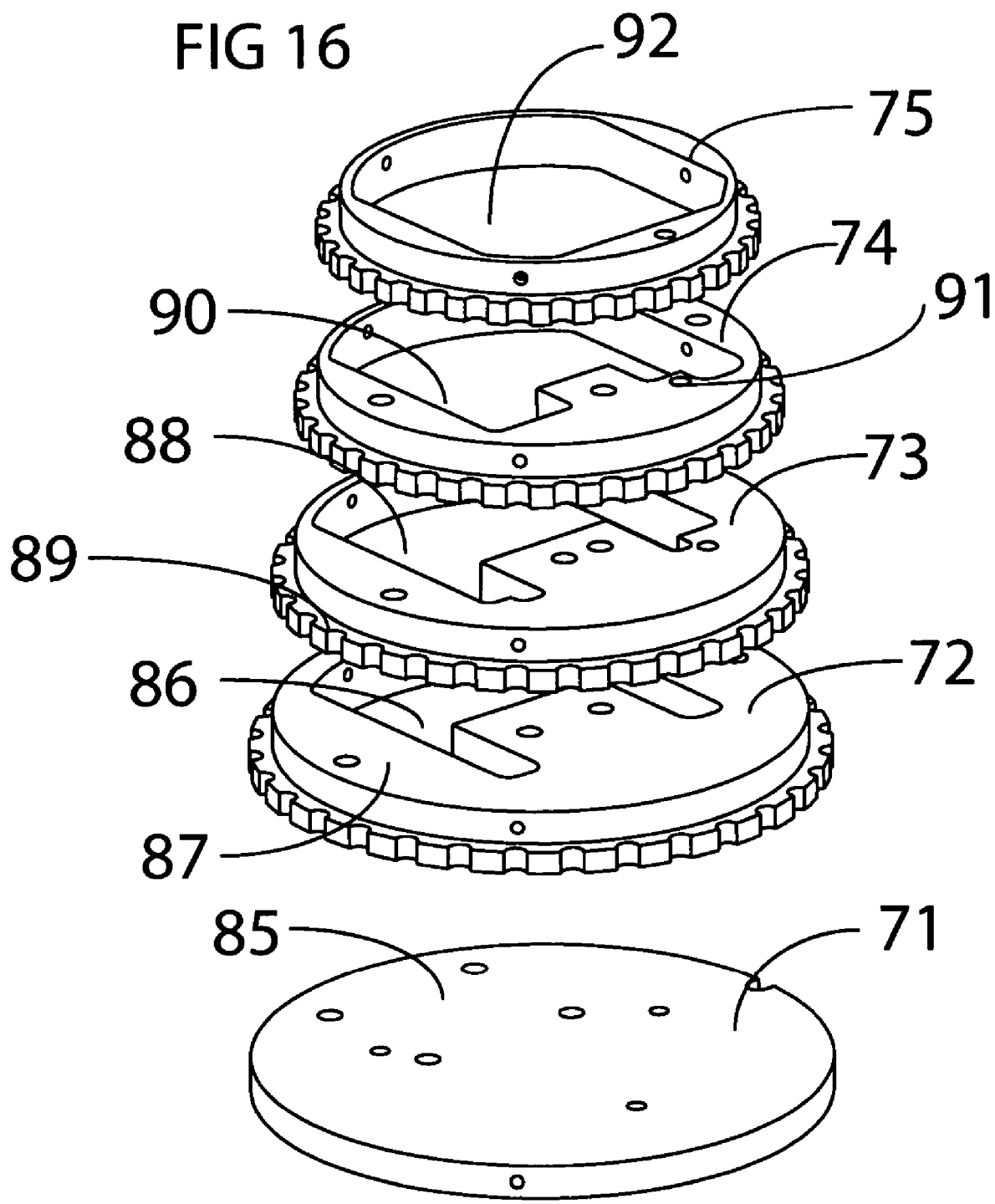
FIG. 16 is a perspective view depicting the mounting plates of FIG. 15.
Figure 17:
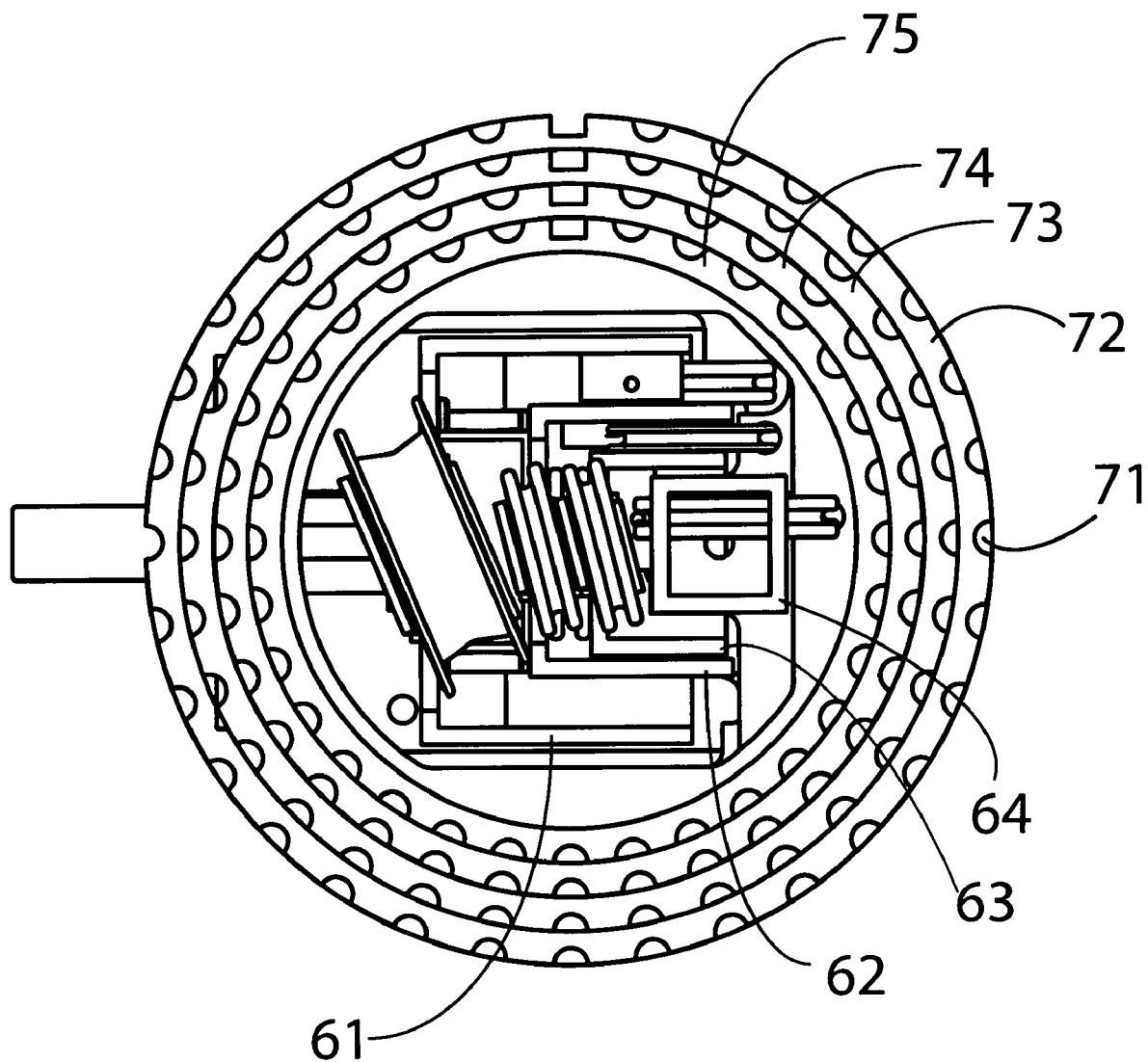
FIG. 17 is a top plan view of the readily extendable, telescopic, multi-element support system of the present invention shown fully assembled with the top mounting plate removed.

As best seen in FIGS. 15 and 16, plate member 72 incorporates a cavity 86, through which C-shaped control segment 61 is able to pass, while also incorporating support zone 87 on which C-shaped control segment 62 is securely mounted. In addition, plate member 73 incorporates a cavity 88 constructed for enabling both C-shaped control segments 61 and 62 to pass therethrough, while also incorporating support zone 89 on which C-shaped control segment 63 is securely mounted.

Finally, plate member 74 is constructed with an enlarged cavity 90 for enabling C-shaped control segments 61, 62, and 63 to pass therethrough, while also incorporating support zone 91 on which square tube member 64 is securely mounted. By employing this construction, the telescopic, longitudinal movement of C-shaped control segments 62 and 63, along with square tube member 64 is able to be achieved with plate members 72, 73, and 74 securely holding and supportingly maintaining each component mounted thereto.

As with the embodiment detailed above, this embodiment of the present invention also preferably incorporates a plurality of tube members cooperatively associated with each control segment. Although these tube members are not shown in FIGS. 10-17, the tube member construction is substantially identical to the construction shown in FIGS. 1-8. In this regard, each tube member incorporates progressively smaller diameters for enabling the tube members to be coaxially aligned with each other in the desired telescopic manner. Furthermore, each tube member is securely affixed to one of the plate members at the smooth outer edge formed on the plate member.

Finally, plate member 75 is also employed and is securely affixed to the tube member having the smallest diameter. In addition, plate member 75 incorporates enlarged aperture or cavity 92 formed therein in order to enable control segments 61, 62, in 63 to pass therethrough, along with square tube member 64. In this way, plate member 75 is advanced longitudinally along the entire length of each coaxially aligned component for positioning the last tube member in the precisely desired location. In order to assure the proper movement of plate member 75 and the tube member secured thereto, plate member 75 and its associated tube member are interconnected with chain/cable 66 and longitudinally moved therewith in the desired controlled manner.

As mentioned above, in this embodiment of the present invention, synchronization belts/cables 35 are employed along with pulleys 33 and 34 mounted to the top and bottom of the control segments to which these component are secured. With synchronization belt/cables 35 secured to each other in the manner detailed above for cooperative operation of C-shaped control segments 62 and 63, as well as square tube member 64, the desired, fully integrated, trouble-free, dependable longitudinal movement of multi-element support system 20 in the precisely desired manner with both simplicity and speed is achieved.

Furthermore, this controlled longitudinal, telescopic raising and lowering of these elements in the precisely desired manner is further enhanced, in this embodiment, by the use of chain/cable 66 as the sole lifting cable for all components. As a result, this embodiment, as well as the embodiment detailed above provides the desired enhanced trouble-free operation sought in the industry.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A readily extendable, multi-element support system comprising
    A. a support base;
    B. a plurality of tube members coaxially aligned with each other and constructed for telescopic movement relative to each other, with one of said tube members being mounted to the support base;
    C. a plurality of plate members each mounted to the bottom edge of one tube member and constructed for longitudinal movement along the length of at least one tube member;
    D. a plurality of independent, elongated control segments cooperatively associated with each other and constructed for longitudinal movement relative to each other, with each control segment being mounted to one tube member and one plate member for enabling said tube member and plate member to move longitudinally with the longitudinal movement of the control segment; and
    E. a drive assembly comprising a chain drive belt and a sprocket drive wheel cooperatively associated with the chain drive belt for causing said belt to move longitudinally along the length of at least one elongated control segment, with the chain drive belt being interconnected with at least one plate member for causing said plate member to move longitudinally with the movement of the chain drive belt,
    whereby a fully integrated, multi-element support system is achieved wherein a plurality of elongated control segments are repeatedly and reliably longitudinally extended in a fully controlled and rapid manner.

2. The readily extendable, multi-element support system defined in claim 1, wherein the chain drive belt of the drive assembly is further defined as being interconnected to each of the plate members for controlling the longitudinal movement of each plate member and its associated tube member and control segment.

3. The readily extendable, multi-element support system defined in claim 2, wherein said chain drive belt is open-ended with one free end thereof secured to the control segment being raised to the highest level.

4. The readily extendable, multi-element support system defined in claim 1, wherein said system further comprises:
    F. a plurality of independent synchronization systems mounted to a plurality of the control segments, with each synchronization system comprising
        a. a first pulley mounted at a first end of the elongated control segment,
        b. a second pulley mounted at a second end of the elongated control segment, and
        c. an endless loop synchronization belt or cable extending between the first pulley and the second pulley in frictional engagement therewith.

5. The readily extendable, multi-element support system defined in claim 4, wherein said system further comprises:
    G. a plurality of locking brackets
        a. independently mounted to the first end of a plurality of the elongated control segments, and
        b. securely affixed to the endless loop belt/cable of an adjacent elongated control segment,
    whereby the movement of the endless loop belt/cable about the pulleys of the control segment causes the simultaneous longitudinal movement of the adjacent control segment.

6. The readily extendable, multi-element support system defined in claim 5, wherein each elongated control segment is further defined as being mounted at its lower terminating end to a plate member with one tube member mounted at its lower terminating end to the plate member, thereby enabling the plate member, the control segment, and the tube member to move as a integral component.

7. The readily extendable, multi-element support system defined in claim 5, wherein each of the independent, elongated control segments are constructed and dimensioned for being positioned in adjacent, side to side relationship in an optimum, compact configuration.

8. The readily extendable, multi-element support system defined in claim 7, wherein each of the plurality of elongated control segments comprise a cross-sectional shape which enables the control segments to be positioned in a substantially circular array.

9. The readily extendable, multi-element support system defined in claim 8, wherein four elongated control segments are employed and each of said control segments are constructed in a substantially triangular shape with the outer edge thereof comprising an arcuate distance of about 90°.

10. The readily extendable, multi-element support system defined in claim 5, wherein said system further comprises an enlarged support base constructed for being positioned in any desired location for securely supporting the multi-element support system in its entirety.

11. The readily extendable, multi-element support system defined in claim 10, wherein each elongated control segment is mounted at its lower terminating end to a plate member and one of said control segments and plate members form the lowermost plate member/control segment assembly with said assembly being securely affixed to the support base.

12. The readily extendable, multi-element support system defined in claim 11, wherein said system further comprises a first sprocket drive member rotationally mounted at the lower terminating end of the lowermost plate member/control segment assembly with said sprocket drive member incorporating an elongated drive arm extending outwardly therefrom and constructed for causing said sprocket drive member to be rotationally driven.

13. The readily extendable, multi-element support system defined in claim 12, wherein said the lowermost plate member/control segment assembly further comprises a second sprocket drive member rotationally mounted at the upper terminating end thereof with an endless chain drive belt extending between the first sprocket drive member and the second drive member for being continuously moved longitudinally along the length of the control segment whenever said first sprocket drive member is rotationally driven by the movement of the drive arm.

14. The readily extendable, multi-element support system defined in claim 13, wherein said drive arm is position for being rotationally moved by an external drive force comprising one selected from the group consisting of cranks, motors, drills, and torque producing assemblies.

15. The readily extendable, multi-element support system defined in claim 14, wherein at least three elongated control segments are cooperatively associated with each other and positioned in juxtaposed, side to side relationship, with the lowermost plate member/control segment assembly incorporating a first of said elongated control segments with the locking bracket affixed to the first end of said control segment being securely engaged with the endless loop belt of a second elongated control segment for causing said second elongated control segment to move longitudinally with the longitudinal movement of the first elongated control segment.

16. The readily extendable, multi-element support system defined in claim 15, wherein the locking bracket affixed to the first terminating end of the second elongated control segment is securely affixed to the endless loop belt of a third elongated control segment for causing said third elongated control segment to move simultaneously with the movement of both the first elongated control segment in the second elongated control segment, whereby the entire multi-element support system of the present invention is longitudinally moved upwardly simultaneously upon activation of the drive arm.

17. A readily extendable, multi-element support system comprising
  A. a support base;
  B. a plurality of tube members coaxially aligned with each other and constructed for telescopic movement relative to each other, with one of said tube members being mounted to the support base;
  C. a plurality of plate members each mounted to the bottom edge of one tube member and constructed for longitudinal movement along the length of at least one tube member;
  D. a plurality of independent, elongated control segments cooperatively associated with each other and constructed for longitudinal movement relative to each other, with each control segment being mounted to one tube member and one plate member for enabling said tube member and plate member to move longitudinally with the longitudinal movement of the control segment and with one control segment being immovable and affixed to the support base;
  E. a drive assembly comprising a chain drive belt and a sprocket drive wheel cooperatively associated with the chain drive belt for causing said belt to move longitudinally along the length of the immovable elongated control segment, with the chain drive belt being interconnected with at least one plate member for causing said plate member to move longitudinally with the movement of the chain drive belt,
  F. a plurality of independent synchronization systems mounted to a plurality of the control segments, with each synchronization system comprising
    a. a first pulley mounted at a first end of the elongated control segment,
    b. a second pulley mounted at a second end of the elongated control segment, and
    c. an endless loop synchronization belt or cable extending between the first pulley and the second pulley in frictional engagement therewith;
  G. a plurality of locking brackets
    a. independently mounted to the first end of a plurality of the elongated control segments, and
    b. securely affixed to the endless loop belt/cable of an adjacent elongated control segment; and
  H. a plurality of interconnection means mounted between a plurality of plate members and the synchronization belt/cable of an adjacent elongated control segment;
  whereby a fully integrated, multi-element support system is achieved wherein a plurality of elongated control segments are repeatedly and reliably longitudinally extended in a fully controlled and rapid manner with each control segment moving symmetrical to the other control segments.

18. The readily extendable, multi-element support system defined in claim 17, wherein the lowermost plate member and immovable control segment further comprises a second sprocket drive member rotationally mounted at the upper terminating end thereof with the endless chain drive belt extending between the first sprocket drive member and the second drive member for being continuously moved longitudinally along the length of the control segment whenever said first sprocket drive member is rotationally driven by the movement of the drive arm.

19. The readily extendable, multi-element support system defined in claim 18, wherein said drive arm is position for being rotationally moved by an external drive force comprising one selected from the group consisting of cranks, motors, drills, and torque producing assemblies.

* * * * *